US009297415B2

(12) United States Patent
Chu (10) Patent No.: US 9,297,415 B2
(45) Date of Patent: Mar. 29, 2016

(54) LINEAR ACTUATOR

(71) Applicant: Hiwin Technologies Corp., Taichung (TW)

(72) Inventor: Yung-Chin Chu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 91 days.

(21) Appl. No.: 14/245,766

(22) Filed: Apr. 4, 2014

(65) Prior Publication Data

US 2015/0285299 A1   Oct. 8, 2015

(51) Int. Cl.
*F16C 29/06* (2006.01)

(52) U.S. Cl.
CPC ......... *F16C 29/0611* (2013.01); *F16C 29/0657* (2013.01)

(58) Field of Classification Search
CPC .. F16C 29/06; F16C 29/0602; F16C 29/0604; F16C 29/0609; F16C 29/0611; F16C 29/0633; F16C 29/0635; F16C 29/0638; F16C 29/0652; F16C 29/0654; F16C 29/0657–29/0666; F16C 29/0642–29/065
See application file for complete search history.

(56) References Cited

U.S. PATENT DOCUMENTS

| | | | | |
|---|---|---|---|---|
| 6,520,681 | B2 * | 2/2003 | Ishihara | F16C 29/0657 384/45 |
| 6,685,355 | B2 * | 2/2004 | Kuwahara | F16C 43/04 384/44 |
| 8,220,997 | B2 * | 7/2012 | Chen | F16C 29/0609 384/45 |

FOREIGN PATENT DOCUMENTS

SE   DE 102009017173   * 10/2010 ......... F16C 29/0602

\* cited by examiner

*Primary Examiner* — Alan B Waits
(74) *Attorney, Agent, or Firm* — Wang Law Firm, Inc.

(57) ABSTRACT

A linear actuator includes a slide, a first half return member, a second half return member and a slide block. The first and second half return members are hollow frames and sleeved onto the rail. A circulation path can be formed when the first and second half return members and the slide block are assembled together, the second half return member is directly disposed in the first radial gap of the first half return member, and the slide block is directly disposed in the second radial gap of the second half return member. Furthermore, there is no level difference in the first and second return grooves of the two half return members, which will prevent noise caused during movement of the rolling elements, reduce impact of the rolling elements against the circulation path, and therefore extending the life of the linear actuator.

8 Claims, 10 Drawing Sheets

LINEAR ACTUATOR

BACKGROUND OF THE INVENTION

1. Field of the Invention

The present invention relates to an actuator, and more particularly to a linear actuator.

2. Description of the Prior Art

Figure 1:
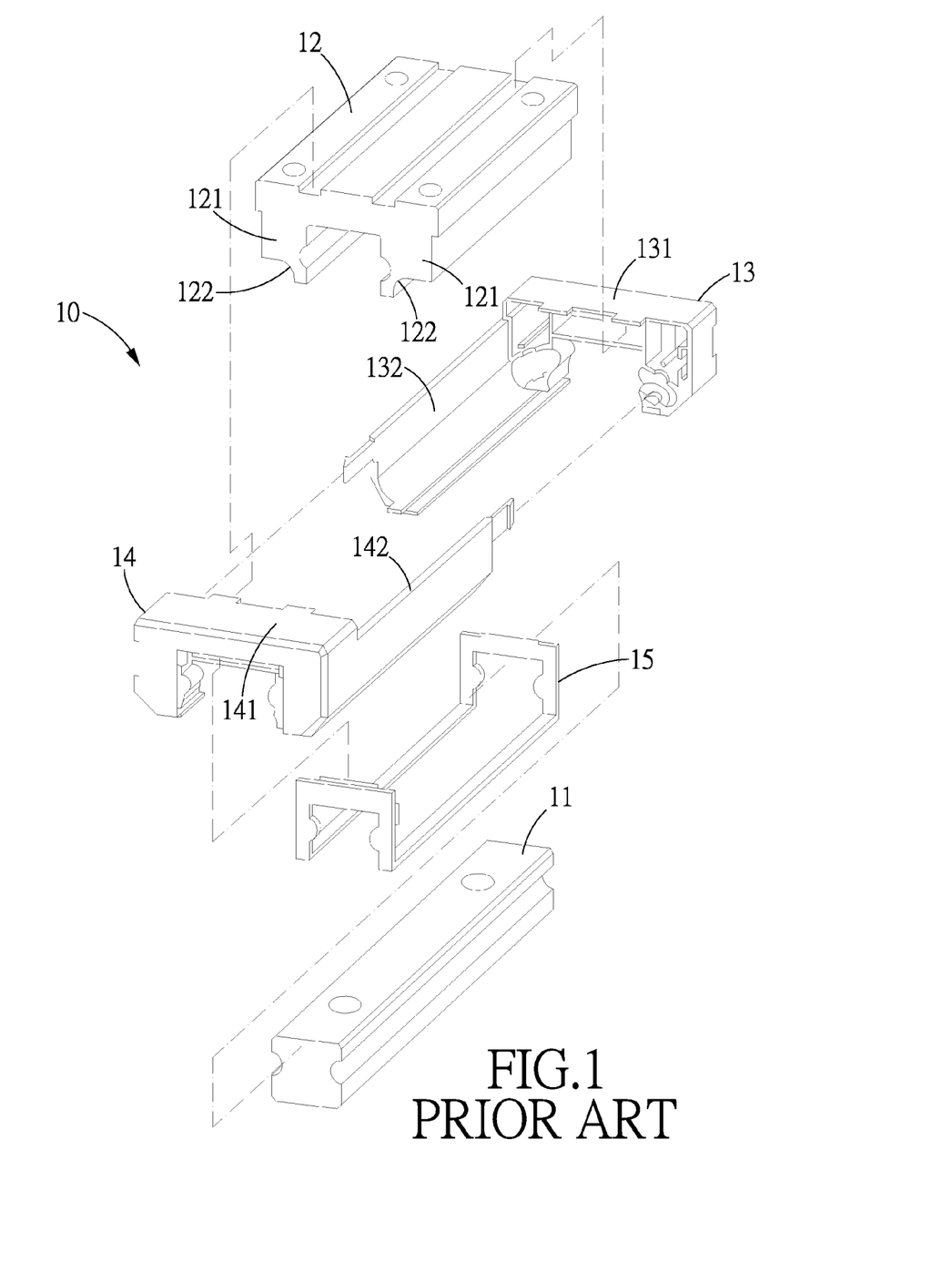
FIG. 1 is an exploded view of a conventional linear guideway.
Figure 2:
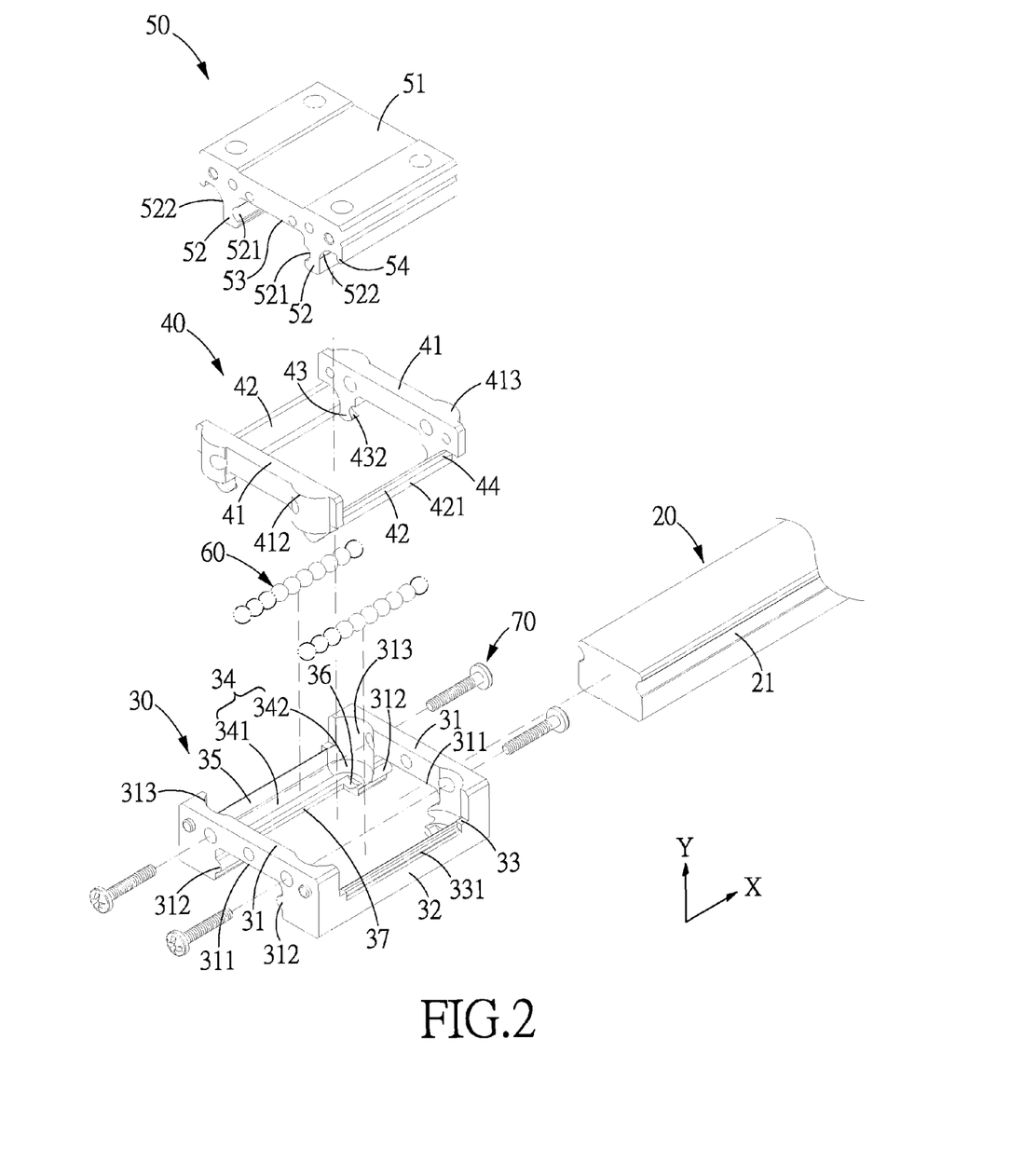
FIG. 2 is an exploded view of a linear actuator in accordance with a first embodiment of the present invention.
Figure 3:
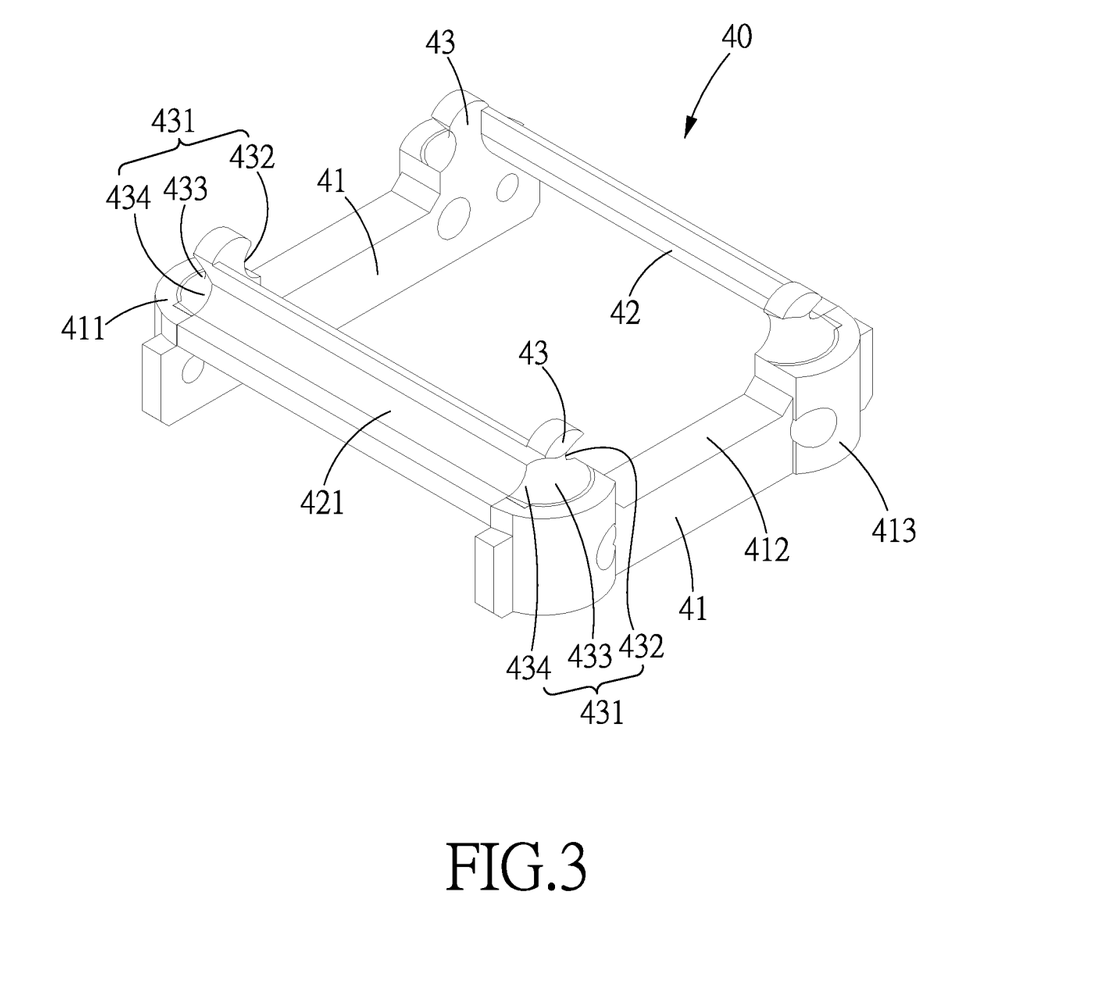
FIG. 3 shows a second half return member of the linear actuator in accordance with the present invention.
Figure 4:
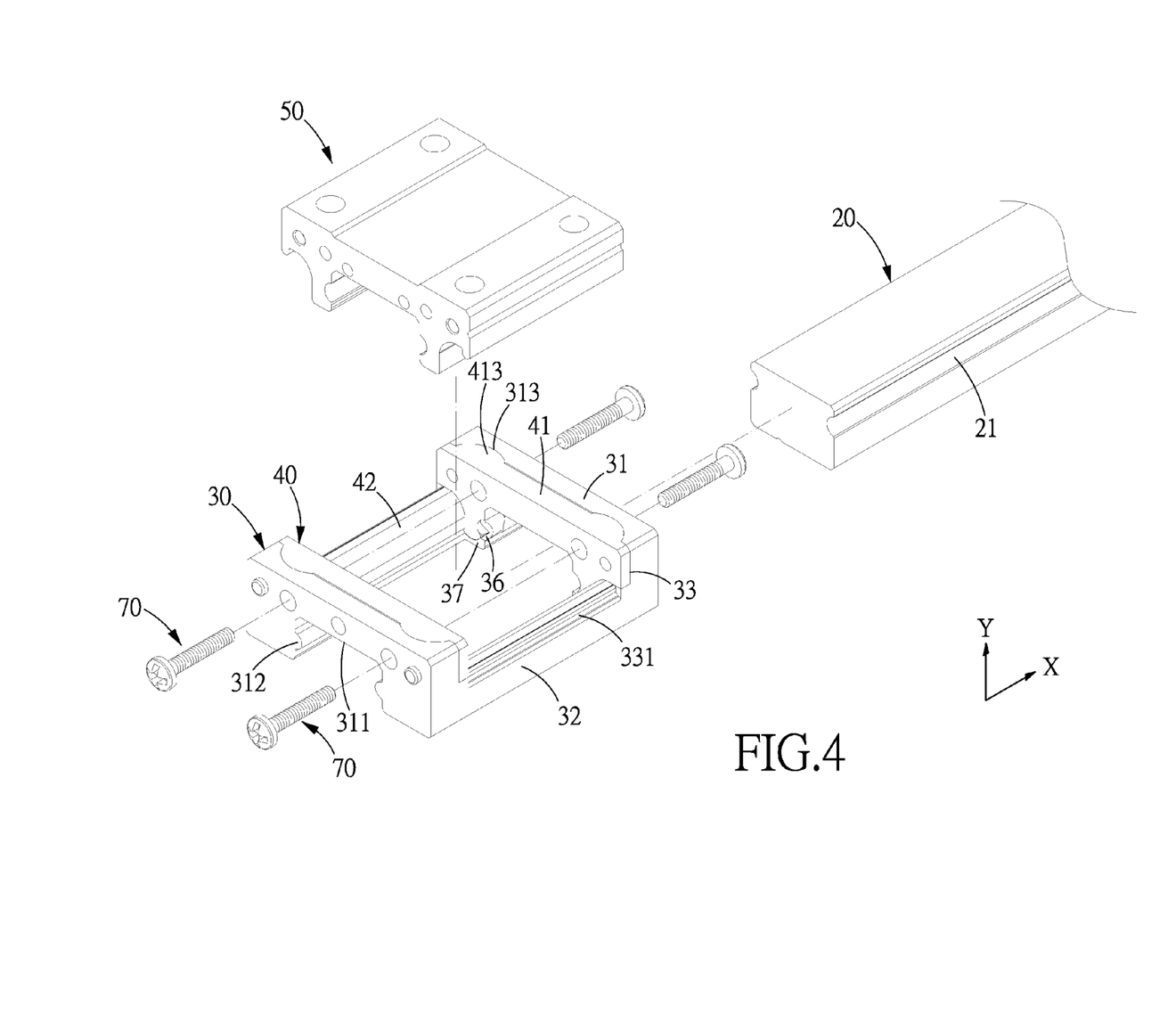
FIG. 4 is another exploded view of the linear actuator in accordance with the present invention.
Figure 5:
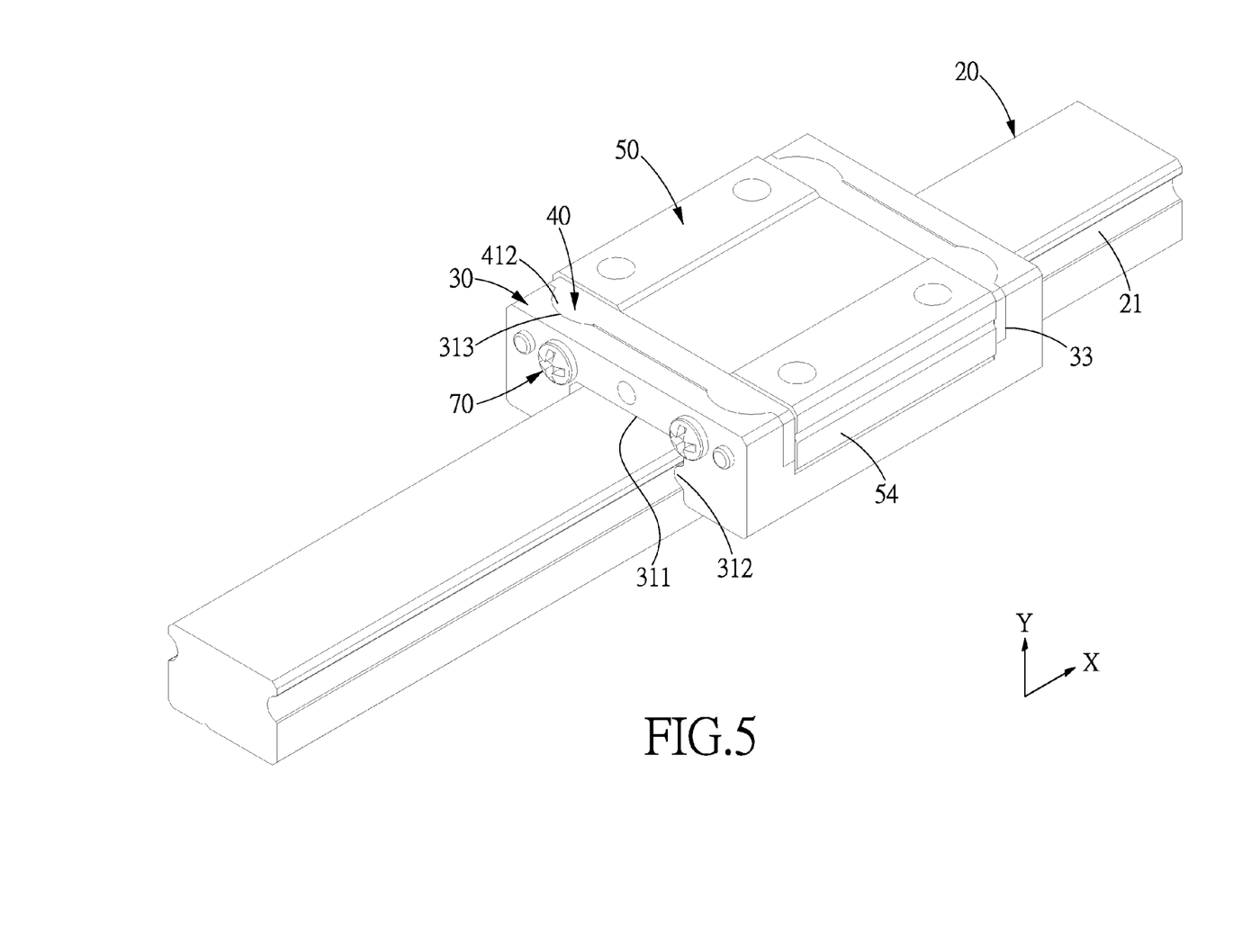
FIG. 5 is an assembly view of the linear actuator in accordance with the present invention.
Figure 6:
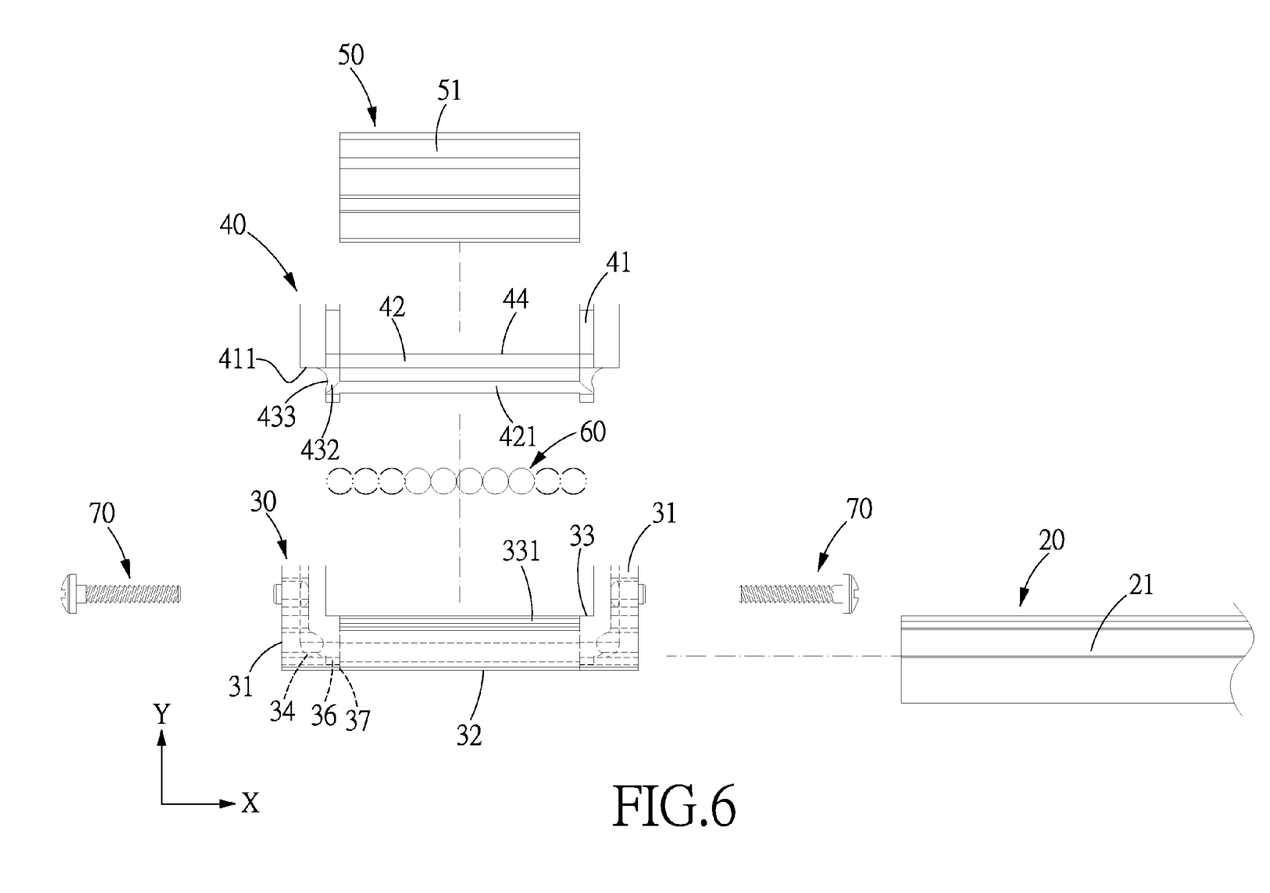
FIG. 6 is another exploded view of the linear actuator in accordance with the present invention.
Figure 7:
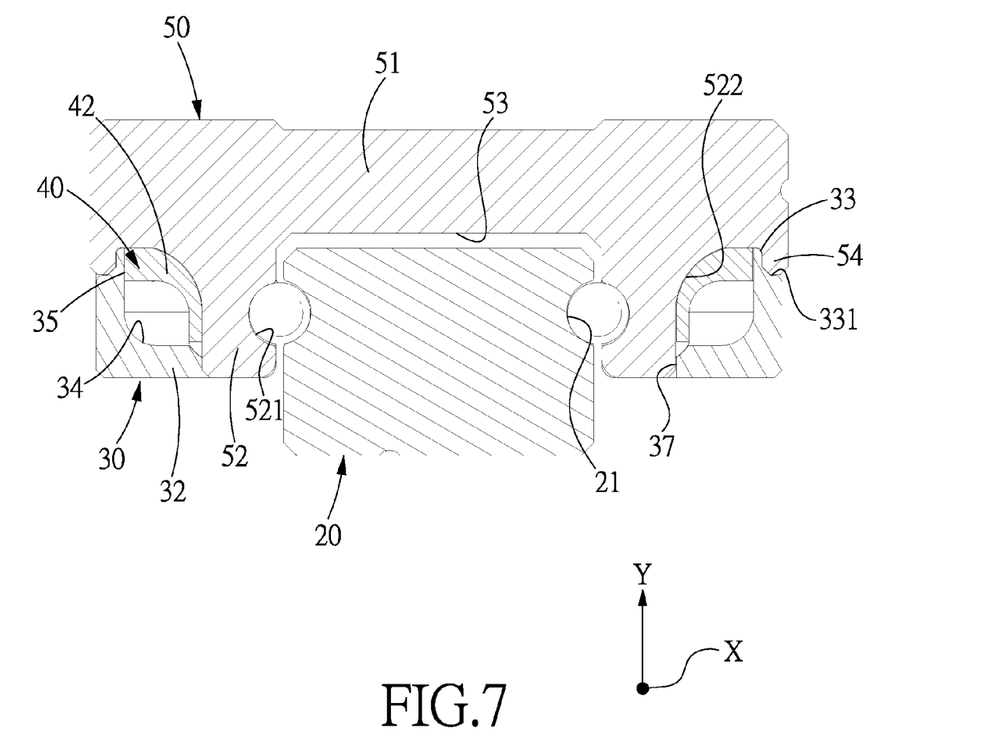
FIG. 7 is a cross sectional view of the linear actuator in accordance with the present invention.
Figure 8:
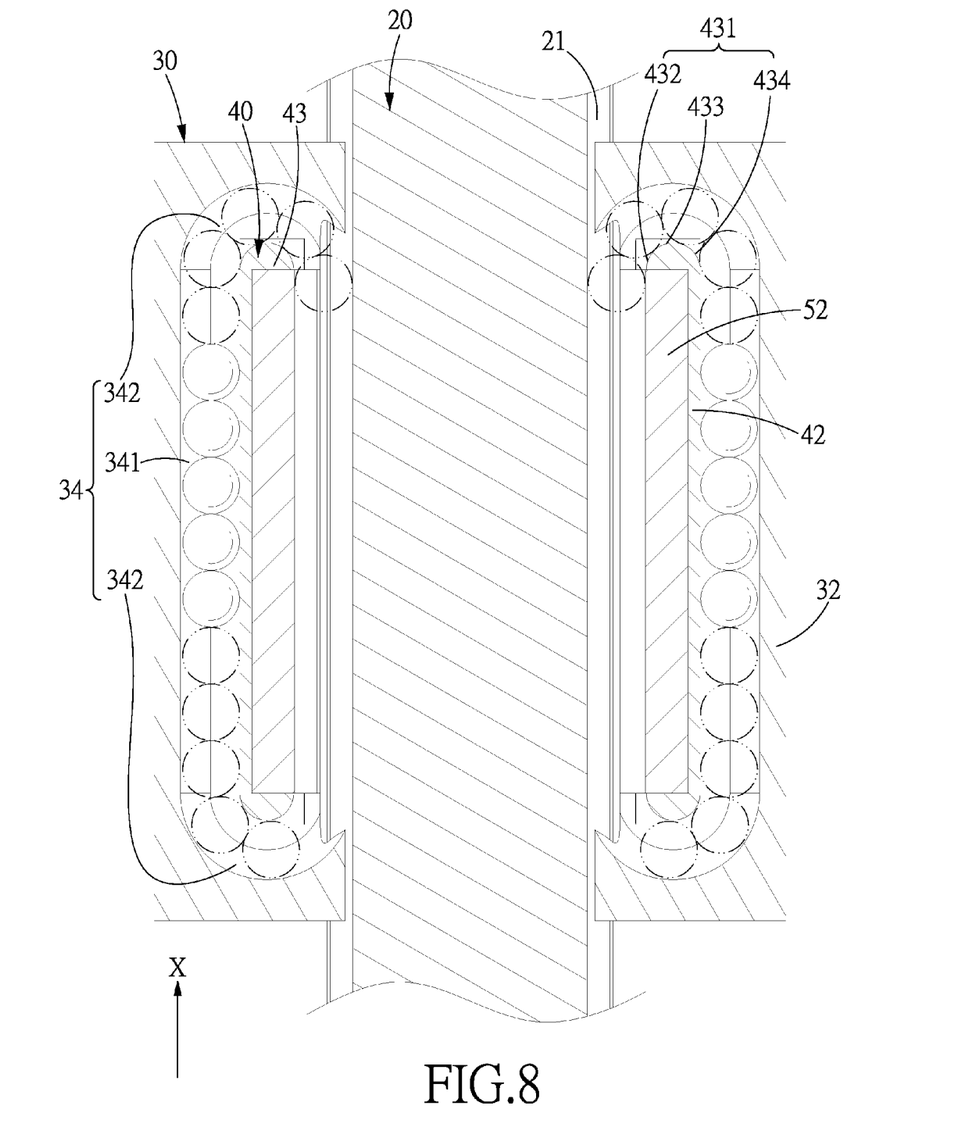
FIG. 8 is another cross sectional view of the linear actuator in accordance with the present invention.

A conventional linear guideway 10 as shown in FIG. 1 comprises a rail 11, a slide block 12, two return members 13, 14, and an end cover 15. The slide block 12 is slidably mounted on the rail 11, and includes two lateral portions 121. At each of the lateral portions 121 is defined an arc-shaped groove 122. The two return members 13, 14 each are an L-shaped structure which consists of an end portion 131, 141 and a return portion 132, 142. The return members 13, 14 are disposed at two ends of the slide block 12 in a manner that the return portions 132, 142 cooperate with the arc-shaped grooves 122 to define a return path for the rolling elements. Then, the end cover 15 covers and fixes the two return members 13, 14.

The return path of the linear guideway is formed by coupling the two return members 13, 14 together. However, level difference is likely to exist at the conjunction of the two return members, which will cause noise during the movement of the rolling elements. Furthermore, the assembly of the linear guideway must be very precise in order to reduce the level surface, which therefore makes the assembly more difficult, and also increases the manufacturing cost.

The present invention has arisen to mitigate and/or obviate the afore-described disadvantages.

SUMMARY OF THE INVENTION

The primary objective of the present invention is to provide a linear actuator without the disadvantages of the conventional linear guideway as described above.

To achieve the above objective, a linear actuator in accordance with the present invention comprises:

an elongated rail extending along an axial direction, and including two rolling grooves at both sides thereof extending in the axial direction;

a first half return member being a hollow frame integrally formed with two opposite outer end portions and two opposite first return portions, each of the outer end portions including a first engaging slot, each of the first return portions being formed with a first return groove, the first half return member being slidably mounted on the rail in a manner that the rail is engaged in the first engaging slots;

a second half return member being a hollow frame integrally formed with two opposite inner end portions and two opposite second return portions, each of the inner end portions including two guiding protrusions each of which extends from a restricting surface of each of the inner end portions, each of the guiding protrusions including a guiding surface which is a partially circular surface, the inner end portions of the second half return member being connected to the guiding surfaces of the guiding protrusions and each of the inner end portions of the second half return member being formed with a second engaging slot, each of the second return portions including a second return groove extending along the axial direction and the second return groove being connected to two corresponding ones of the guiding surfaces, the second half return member being inserted between the two outer end portions of the first half return member, in a manner that the rail is inserted through the second engaging slots, the guiding surfaces of the guiding protrusions of the second half return member are connected to the first return grooves, the second return grooves are in communication with the first return grooves, the guiding surfaces are located toward the first return grooves, the first return grooves cooperate with the second return grooves, and the restricting surfaces of the second half return member to define a return path; and a slide block with a top surface, two lateral portions, and an engaging slot defined between the two lateral portions and extending along the axial direction, two opposite rolling grooves extending along the axial direction being formed on the two lateral portions, the slide block being received between the two inner end portions of the second half return member, in a manner that the rail is inserted through the engaging slot of the slide block, the opposite rolling grooves of the slide block cooperate with the rolling grooves of the rail to define a load path which is connected to the guiding surfaces of the second half return member and is in communication with the return path, and the load path and the return path are connected to form an endless circulation path in which a plurality of rolling elements are able to move endlessly;

a direction perpendicular to the axial direction is defined as a radial direction, the two first return portions are closer to the axial direction than the two outer end portions, so as to define a first radial gap between the two outer portions and the two first return portions, on the outer surface of each of the first return portions is formed an abutting portion which is a stepped groove concaved from the first radial gap, another surface of each of the lateral portions of the slide block is formed an outer groove extending along the axial direction, between each of the outer grooves and the top surface is formed a covering portion extending in the radial direction, and the covering portions of the slide block are engaged with the abutting portions of the first half return member.

The design of the first and second half return members being hollow frames and sleeved onto the rail can substantially reduce the number of components of the linear actuator. A circulation path can be formed when the first half return member, the second half return member and the slide block are assembled together, the second half return member is directly disposed in the first radial gap of the first half return member, and the slide block is directly disposed in the second radial gap of the second half return member, which make the assembly much easier. Furthermore, the first and second half return members are integral frames, there is no level difference in the first and second return grooves of the two half return members, which will prevent noise caused during movement of the rolling elements, reduce impact of the rolling elements against the circulation path, and therefore extending the life of the linear actuator.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 2-10, a linear actuator in accordance with a preferred embodiment of the present invention comprises: a rail 20, a first half return member 30, a second half return member 40, a slide block 50, a plurality of rolling elements 60, and a plurality of fasteners 70.

The rail 20 is an elongated structure extending along an axial direction X, and includes two rolling grooves 21 at both sides thereof extending in the axial direction X. A direction perpendicular to the axial direction X is defined as a radial direction Y.

The first half return member 30 is integrally formed with two opposite outer end portions 31 and two opposite first return portions 32 located between the two outer end portions 31, so that the two outer end portions 31 and the two first return portions 32 define a hollow frame. The two first return portions 32 are closer to the axial direction X than the two outer end portions 31, so as to define a first radial gap 33 between the two outer end portions 31 and the two first return portions 32. Each of the outer end portions 31 includes a first engaging slot 311 and two opposite arc-shaped protrusions 312 on an inner surface of the first engaging slot 311. The first engaging slots 311 are located opposite to each other, and open in a direction different from the direction in which the radial gap 33 opens.

The two outer end portions 31 and the two first return portions 32 each have an inner surface, and an outer surface (the inner surfaces of the two outer end portions 31 are located toward each other). On the inner surface of each of the two outer end portions 31 is formed a plurality of positioning portions 313 which are arc-shaped concaves in this embodiment. On the inner surface of each of the first return portions 32 is formed a first return groove 34 which consists of a straight section 341 extending along the axial direction X, and two arc-shaped sections 342 connected to two ends of the straight section 341. Between each of the first return grooves 34 and the first radial gap 33 is formed an inner later surface 35 which is a flat surface. Each of the first return portions 32 is formed with a positioning cavity 36 which is located beside the first return grooves 34, and a positioning gap 37 is communicated with the positioning cavity 36. On the outer surface of each of the first return portions 32 is formed an abutting portion 331 which is a groove concaved from the first radial gap 33. In this embodiment, the abutting portion 331 is a stepped groove. The first half return member 30 is slidably mounted on the rail 20 in such a manner that the rail 20 is engaged in the first engaging slots 311, and the opposite arc-shaped protrusions 312 are slidably received in the rolling grooves 21 of the rail 20.

The second half return member 40 is also a hollow frame integrally formed with two opposite inner end portions 41 and two opposite second return portions 42. Each of the inner end portions 41 includes two guiding protrusions 43 each of which extends from a restricting surface 411 of each of the inner end portions 41. Each of the guiding protrusions 43 includes a guiding surface 431 which consists of an arc-shaped inner surface 432, an arc-shaped end surface 433 and an arc-shaped outer surface 434 which are sequentially connected to one another to form a partially circular surface. The arc-shaped inner surface 432 of the inner end portions 41 of the second half return member 40 is connected to the arc-shaped inner surfaces 432 of the guiding protrusions 43 and formed with a second engaging slot 412. Each of the second return portions 42 includes an arc-shaped piece which is formed in the shape of the arc-shaped outer surface 434 of the guiding protrusions 43, and the arc-shaped piece extends along the axial direction X and is connected between the two inner end portions 41. Each of the second return portions 42 includes a second return groove 421 extending along the axial direction X and connected to the arc-shaped outer surface 434. The two inner end portions 41 and the two second return portions 42 define the hollow frame. The two inner end portions 41 and the two second return portions 42 each have an inner surface, and an outer surface (the inner surfaces of the two inner end portions 41 are located opposite each other and located toward the second return portions 42, and the inner surfaces of the two second return portions 42 are also located toward each other). The two second return portions 42 are closer to the axial direction X than the two inner end portions 41, so as to define a second radial gap 44 which opens in a direction different from the direction in which the second engaging slots 412 open. On the outer surface of each of the inner end portions 41 is formed a plurality of restricting portions 413 which are partially circular protrusions in this embodiment, and are shaped to fit in the positioning portions 313 of the outer end portions 31.

The second half return member 40 is inserted between the two outer end portions 31 of the first half return member 30, in such a manner that the restricting portions 413 are engaged in the positioning portions 313, and the guiding protrusions 43 of the second half return member 40 are engaged in the positioning cavities 36 of the first half return member 30. The rail 20 is inserted through the second engaging slots 412, the free ends of the second return portions 42 are abutted against the inner lateral surfaces 35 of the first half return member 30, and the arc-shaped outer surface 434 of the guiding protrusions 43 of the second half return member 40 are connected to the straight sections 341 of the first return grooves 34. The second return grooves 421 are in communication with the straight sections 341 of the first return grooves 34, the arc-shaped end surfaces 433 are connected to the arc-shaped sections 342 of the first return grooves 34, and the restricting surfaces 411 are located toward the arc-shaped sections 342 of the first return grooves 34. By such arrangements, the straight sections 341 and the arc-shaped sections 342 of the first return grooves 34 cooperate with the guiding surfaces 431, the second return grooves 42, and the restricting surfaces 411 of the second half return member 40 to define a return path. The two inner end portions 41 are abutted against the first radial gap 33 of the first half return member 30.

The slide block 50 includes a top surface 51, two lateral portions 52, and an engaging slot 53 defined between the two lateral portions 52 and extending along the axial direction X. Two opposite rolling grooves 521 extending along the axial direction X are formed on one surface of the two lateral portions 52, and another surface of each of the lateral portions 52 is formed an outer groove 522 extending along the axial direction X. Between each of the outer grooves 522 and the top surface 51 is formed a covering portion 54 extending in the radial direction Y. The slide block 50 is received between the two inner end portions 41 of the second half return member 40, in such a manner that the two lateral portions 52 are inserted in the positioning gaps 37 between the inner end portions 41 and the second return portions 42 of the second half return member 40, and the rail 20 is inserted through the engaging slot 53 of the slide block 50. The rolling grooves 521 of the slide block 50 cooperate with the rolling grooves 21 of the rail 20 to define a load path which is connected to the arc-shaped inner surfaces 432 of the second half return member 40 and is in communication with the return path. Hence, the load path and the return path are connected to form an endless circulation path in which the rolling elements 60 can move endlessly. The outer grooves 522 of the slide block 50 are located toward the second radial gap 44 and engaged with second return portions 42 of the second half return member 40, and the covering portions 54 of the slide block 50 are engaged with the abutting portions 331 of the first half return member 30.

The fasteners 70 are inserted through the first half return member 30, the second half return member 40 and the slide block 50 to fix them together.

To assemble the linear actuator of the present invention, it only needs to insert the first half return member 30, the second half return member 40 and the slide block 50 sequentially onto the rail 20, then fix them together by using the fasteners 70.

The design of the first and second half return members 30, 40 being hollow frames and sleeved onto the rail can substantially reduce the number of components of the linear actuator. A circulation path can be formed when the first half return member 30, the second half return member 40 and the slide block 50 are assembled together, the second half return member 40 is directly disposed in the first radial gap 33 of the first half return member 30, and the slide block 50 is directly disposed in the second radial gap 44 of the second half return member 40, which make the assembly much easier.

Furthermore, the first and second half return members 30, 40 are integral frames, there is no level difference in the first and second return grooves 34, 421 of the two half return members, which will prevent noise caused during movement of the rolling elements 60, reduce impact of the rolling elements 60 against the circulation path, and therefore extending the life of the linear actuator.

Figure 9:
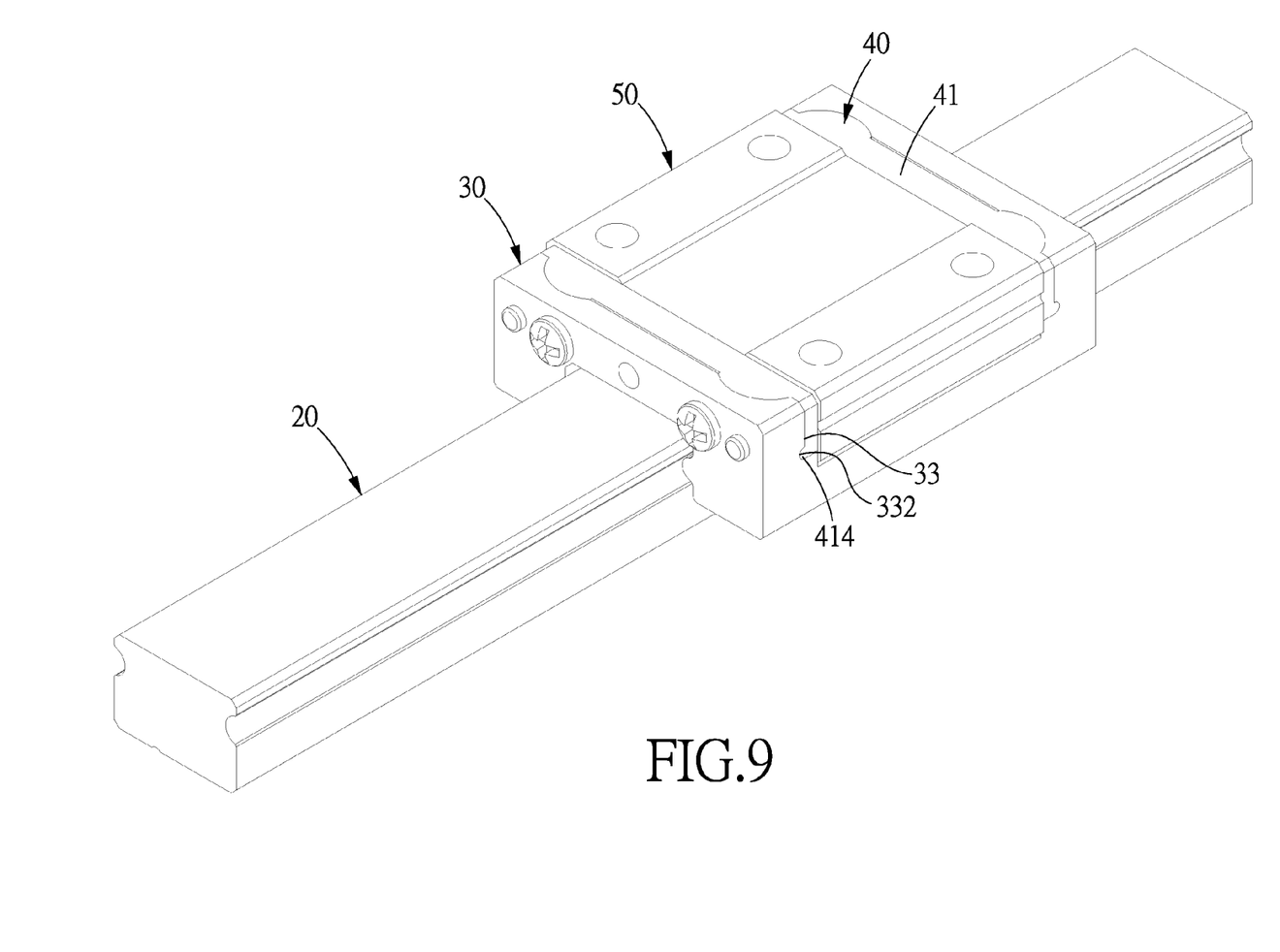
FIG. 9 shows a linear actuator in accordance with a second embodiment of the present invention.
Figure 10:
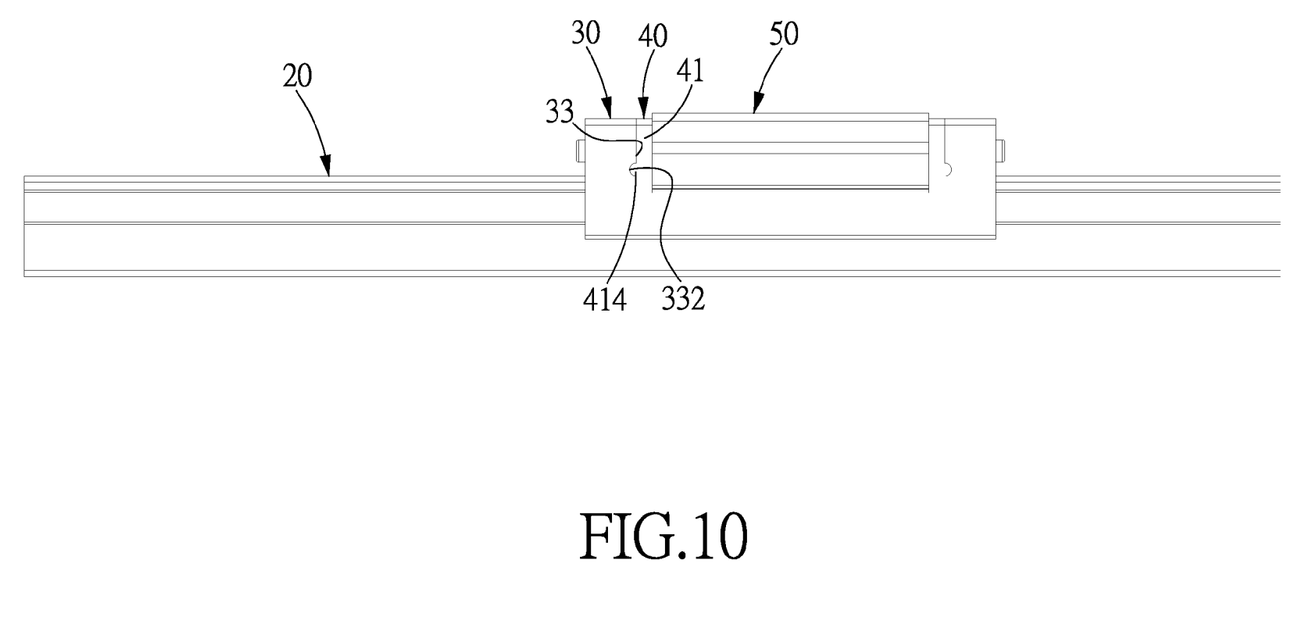
FIG. 10 is a side view of the linear actuator in accordance with the second embodiment of the present invention.

Referring then to FIGS. 9 and 10, to improve the assembly stability between the first and second half return members 30, 40, an engaging groove 332 can be formed in the first radial gap 33 of the first half return member 30 and extends along the axial direction X, and an engaging rib 414 extending along the axial direction X is formed on the inner end portions 41 of the second half return member 40 to engage with the engaging groove 332 when the first and second half return members 30, 40 are assembled to each other.

While we have shown and described various embodiments in accordance with the present invention, it is clear to those skilled in the art that further embodiments may be made without departing from the scope of the present invention.

What is claimed is:

1. A linear actuator comprising:
   an elongated rail extending along an axial direction, and including two rolling grooves at both sides thereof extending in the axial direction;
   a first half return member being a hollow frame integrally formed with two opposite outer end portions and two opposite first return portions, each of the outer end portions including a first engaging slot, each of the first return portions being formed with a first return groove, the first half return member being slidably mounted on the rail in a manner that the rail is engaged in the first engaging slots;
   a second half return member being a hollow frame integrally formed with two opposite inner end portions and two opposite second return portions, each of the inner end portions including two guiding protrusions each of which extends from a restricting surface of each of the inner end portions, each of the guiding protrusions including a guiding surface which is a partially circular surface, the inner end portions of the second half return member being connected to the guiding surfaces of the guiding protrusions and each of the inner end portions of the second half return member being formed with a second engaging slot, each of the second return portions including a second return groove extending along the axial direction and the second return groove being connected to two corresponding ones of the guiding surfaces, the second half return member being inserted between the two outer end portions of the first half return member, in a manner that the rail is inserted through the second engaging slots, the guiding surfaces of the guiding protrusions of the second half return member are connected to the first return grooves, the second return grooves are in communication with the first return grooves, the guiding surfaces are located toward the first return grooves, the first return grooves cooperate with the second return grooves, and the restricting surfaces of the second half return member to define a return path; and
   a slide block with a top surface, two lateral portions, and an engaging slot defined between the two lateral portions and extending along the axial direction, two opposite rolling grooves extending along the axial direction being formed on the two lateral portions, the slide block being received between the two inner end portions of the second half return member, in a manner that the rail is inserted through the engaging slot of the slide block, the opposite rolling grooves of the slide block cooperate with the rolling grooves of the rail to define a load path which is connected to the guiding surfaces of the second half return member and is in communication with the return path, and the load path and the return path are connected to form an endless circulation path in which a plurality of rolling elements are able to move endlessly;
   a direction perpendicular to the axial direction is defined as a radial direction, the two first return portions are closer to the axial direction than the two outer end portions, so as to define a first radial gap between the two outer portions and the two first return portions, on the outer surface of each of the first return portions is formed an abutting portion which is a stepped groove concaved from the first radial gap, another surface of each of the lateral portions of the slide block is formed an outer groove extending along the axial direction, between each of the outer grooves and the top surface is formed a covering portion extending in the radial direction, and the covering portions of the slide block are engaged with the abutting portions of the first half return member.

2. The linear actuator as claimed in claim 1, wherein each of the first engaging slots includes two opposite arc-shaped protrusions which are formed on an inner surface thereof and are slidably received in the rolling grooves of the rail.

3. The linear actuator as claimed in claim 1, wherein a plurality of positioning portions are formed on an inner surface of each of the two outer end portions, the two inner end portions each have an inner surface, and an outer surface, the inner surfaces of the two inner end portions are located opposite each other and located toward the second return portions, on the outer surface of each of the inner end portions is formed a plurality of restricting portions which are partially circular protrusions and shaped to fit in the positioning portions of the outer end portions.

4. The linear actuator as claimed in claim 1, wherein each of the first return portions is formed with a positioning cavity which is located beside the first return grooves, and in the positioning cavity is formed a positioning gap, the guiding protrusions of the second half return member are engaged in the positioning cavities of the first half return member, the two lateral portions are inserted in the positioning gaps between the inner end portions and the second return portions of the second half return member, and the first half return member, the second half return member and the slide block are fixed together by a plurality of fasteners.

5. The linear actuator as claimed in claim 1, wherein a direction perpendicular to the axial direction is defined as a radial direction, the two second return portions are closer to the axial direction than the two inner end portions, so as to define a second radial gap which opens in a direction different from a direction in which the second engaging slots open, the outer grooves are located toward the second radial gap and engaged with second return portions of the second half return member.

6. The linear actuator as claimed in claim 1, wherein each of the first return grooves consists of a straight section extending along the axial direction, and two arc-shaped sections connected to two ends of the straight section, each of the guiding surfaces consists of an arc-shaped inner surface, an arc-shaped end surface and an arc-shaped outer surface which are sequentially connected to one another to form a partially circular surface, each of the second return portions includes an arc-shaped piece which is formed in the shape of the arc-shaped outer surface of the guiding protrusions, and the arc-shaped piece extends along the axial direction and is connected between the two inner end portions, each of the second return portions has the second return groove extending along the axial direction and connected to the arc-shaped outer surface, the arc-shaped inner surface of the inner end portions of the second half return member is connected to the arc-shaped inner surfaces of the guiding protrusions and formed with the second engaging slot, the restricting surfaces of the second half return member are located toward the arc-shaped sections of the first return grooves.

7. The linear actuator as claimed in claim 1, wherein each of the first return grooves consists of a straight section extending along the axial direction, and two arc-shaped sections connected to two ends of the straight section, each of the guiding surfaces consists of an arc-shaped inner surface, an arc-shaped end surface and an arc-shaped outer surface which are sequentially connected to one another to form a partially circular surface, each of the second return portions includes an arc-shaped piece which is formed in the shape of the arc-shaped outer surface of the guiding protrusions, and the arc-shaped piece extends along the axial direction and is connected between the two inner end portions, each of the second return portions has the second return groove, the second return grooves are connected to the arc-shaped outer surfaces and the straight sections of the first return grooves, the arc-shaped inner surface of the inner end portions of the second half return member is connected to the arc-shaped inner surfaces of the guiding protrusions, the restricting surfaces of the second half return member are located toward the arc-shaped sections of the first return grooves, the arc-shaped outer surface of the guiding protrusions of the second half return member are connected to the straight sections of the first return grooves, and the rolling grooves of the slide block are connected to the arc-shaped inner surfaces of the second half return member.

8. The linear actuator as claimed in claim 1, wherein a direction perpendicular to the axial direction is defined as a radial direction, the two first return portions are lower in the radial direction than the two outer end portions, so as to define a first radial gap between the two outer portions and the two first return portions, an engaging groove is formed in the first radial gap of the first half return member and extends along the axial direction, and an engaging rib extending along the axial direction is formed on the inner end portions of the second half return member to engage with the engaging groove.

* * * * *